United States Patent
Kawano et al.

(10) Patent No.: US 12,181,364 B2
(45) Date of Patent: Dec. 31, 2024

(54) REDUNDANT SENSOR DEVICE AND METHOD OF DETERMINING ABNORMALITY OF REDUNDANT SENSOR DEVICE

(71) Applicant: Mitsubishi Electric Corporation, Tokyo (JP)

(72) Inventors: Yu Kawano, Tokyo (JP); Takashi Yagihara, Tokyo (JP)

(73) Assignee: Mitsubishi Electric Corporation, Tokyo (JP)

(*) Notice: Subject to any disclaimer, the term of this patent is extended or adjusted under 35 U.S.C. 154(b) by 630 days.

(21) Appl. No.: 17/432,539

(22) PCT Filed: Jun. 28, 2019

(86) PCT No.: PCT/JP2019/025776
§ 371 (c)(1),
(2) Date: Aug. 20, 2021

(87) PCT Pub. No.: WO2020/213180
PCT Pub. Date: Oct. 22, 2020

(65) Prior Publication Data
US 2022/0146350 A1    May 12, 2022

(30) Foreign Application Priority Data

Apr. 17, 2019   (JP) .................. 2019-078330

(51) Int. Cl.
*G01L 5/22* (2006.01)
*B62D 5/04* (2006.01)
*G01L 19/00* (2006.01)

(52) U.S. Cl.
CPC .............. *G01L 5/221* (2013.01); *B62D 5/049* (2013.01); *G01L 19/0061* (2013.01)

(58) Field of Classification Search
CPC ... G01D 5/2046; G01L 5/221; G01L 19/0061; B62D 5/049
See application file for complete search history.

(56) References Cited

U.S. PATENT DOCUMENTS

| 9,164,010 B2 * | 10/2015 | Kuwahara ................. G01L 3/00 |
| 2005/0046418 A1 | 3/2005 | Fukaya et al. |

(Continued)

FOREIGN PATENT DOCUMENTS

| CN | 106063096 A | * 10/2016 | ............ B62D 5/046 |
| CN | 113661377 A | * 11/2021 | ............ B62D 5/049 |
| JP | 6283737 B2 | 2/2018 | |

OTHER PUBLICATIONS

Extended European Search Report dated Apr. 19, 2022 from the European Patent Office in EP Application No. 19925053.1.

(Continued)

*Primary Examiner* — Octavia Hollington
(74) *Attorney, Agent, or Firm* — Sughrue Mion, PLLC; Richard C. Turner (57) ABSTRACT

In at least two groups of independent sensors connected to an electronic control device(s), at least two output signal ports are included in a sensor of a first group, and one output signal port is included in a sensor of a second group; and two output signals in the first group have different characteristics while having a constant relationship to each other defined in advance, and the one output signal in the second group has an equivalent characteristic to either one of the two output signals in the first group. The electronic control device(s) includes an abnormality determination unit which is configured in such a manner that all of output signals of the output signal ports are compared, and, for the control by the electronic control device(s), only a normal output signal(s)

(Continued)

is used among the output signals thereof having been determined by the abnormality determination unit.

16 Claims, 7 Drawing Sheets

(56) References Cited

U.S. PATENT DOCUMENTS

| | | |
|---|---|---|
| 2016/0231142 A1 | 8/2016 | Kawano et al. |
| 2017/0015348 A1 | 1/2017 | Sasaki et al. |
| 2018/0086369 A1 | 3/2018 | Yanagi |

OTHER PUBLICATIONS

Office Action issued Oct. 10, 2023 in Chinese Patent Application No. 201980095098.4.

\* cited by examiner

REDUNDANT SENSOR DEVICE AND METHOD OF DETERMINING ABNORMALITY OF REDUNDANT SENSOR DEVICE

CROSS REFERENCE TO RELATED APPLICATIONS

This application is a National Stage of International Application No. PCT/JP2019/025776 filed Jun. 28, 2019, claiming priority based on Japanese Patent Application No. 2019-078330 filed Apr. 17, 2019.

TECHNICAL FIELD

The present disclosure of the application concerned relates to a redundant sensor device, and to a method of determining abnormality of the redundant sensor device.

BACKGROUND ART

Conventionally, in order to include the redundancy of sensors, a configuration is conceivable in which a plurality of sensors and a plurality of detection circuits corresponding to those sensors are included, and so, in the configuration, the control is continued by using only the other sensor in a case in which, with respect to abnormality on one sensor, the other sensor is normal (for example, refer to Patent Document 1).

RELATED ART DOCUMENT

Patent Document

[Patent Document 1] Japanese Patent Publication No. 6283737

SUMMARY OF THE INVENTION

Problems to be Solved by the Invention

In torque sensors of a conventional electric power steering apparatus disclosed in Patent Document 1, two independent torque detection signals are detected from mutually different detection elements, and a total sum of four electronic circuits and that of four signal limes are included, so that those signals are individually compared, and abnormality of the torque sensors has been detected. In addition, it is also conceivable that, by using three sensors, determination of their normality or abnormality is performed based on majority rule among them.

In a case in which a redundant system is taken into consideration, determination of normality or abnormality can be simply performed for a failure or malfunction which leads to be fixed at an abnormal value in such a simple malfunction as, for example, a disconnection fault, or a short-to-power or short-to-ground fault. However, it is difficult to determine such a malfunction mode that an output value is not fixed, but it varies in value, whereas it does not accurately vary in value, which results in difficulties to determine whether either one of two sensors is normal or not, by means of their simple comparison only. In such a manner as described in Patent Document 1 above, conventionally, a plurality of sensors, a plurality of detection circuits and signal limes are provided, namely, two-fold constituent elements are included at a minimum, and determination is performed by means of their comparison and verification. However, in a case in which the configuration is implemented by such two-fold elements, not only the costs, but also the size and mounting capability result in degradation.

The present disclosure in the application concerned has been directed at disclosing technologies for solving those problems as described above, an object of the disclosure is to provide a redundant sensor device, and a method of determining abnormality of the redundant sensor device in each of which, in a state of maintaining equivalent redundancy to that in a conventional device, a circuit(s) of the conventional device and a signal lime(s) thereof can be reduced, whereby the reduction of the costs and size, and the enhancement of mounting capability are achieved.

Means for Solving the Problems

A redundant sensor device disclosed in the disclosure of the application concerned comprises:
a first sensor for detecting a physical characteristic of a detected subject matter and for outputting signals each corresponding to a physical characteristic being detected, and also for outputting a plurality of those output signals each having a constant relationship defined in advance;
a second sensor for outputting an output signal having an equivalent characteristic to any one of those output signals in the plurality of output signals of the first sensor; and
a plurality of electronic control devices, each having an abnormality determination unit for determining the presence or absence of abnormality of input signals, each of which is mutually connected through a communications line capable of communicating to each other and is configured to independently operate with each other, and also each having a control circuit for outputting a control signal obtained by calculating electric power supplied into the detected subject matter in accordance with the input signals, for controlling the detected subject matter, wherein
the abnormality determination unit is configured to determine the presence or absence of abnormality on output signals of the first sensor and that on an output signal of the second sensor, and an output signal determined being normal is used as the control signal.

Effects of the Invention

According to the redundant sensor device disclosed in the disclosure of the application concerned, a circuit(s) of a conventional device and a signal lime(s) thereof can be reduced in a state of maintaining equivalent redundancy to that in a conventional device, whereby it becomes possible to provide a redundant sensor device, and a method of determining abnormality of the redundant sensor device in both of which the reduction of the costs and size, and the enhancement of mounting capability are achieved.

EMBODIMENTS FOR CARRYING OUT THE INVENTION

The disclosure of the application concerned relates to a redundant sensor device in which constituent elements are reduced while on the occasion to have the redundancy.

Hereinafter, the exemplary explanation will be made referring to the drawings for an example of preferred embodiment of a redundant sensor device in the disclosure of the application concerned in which torque sensors are used in an electric power steering apparatus.

Embodiment 1

Figure 1:
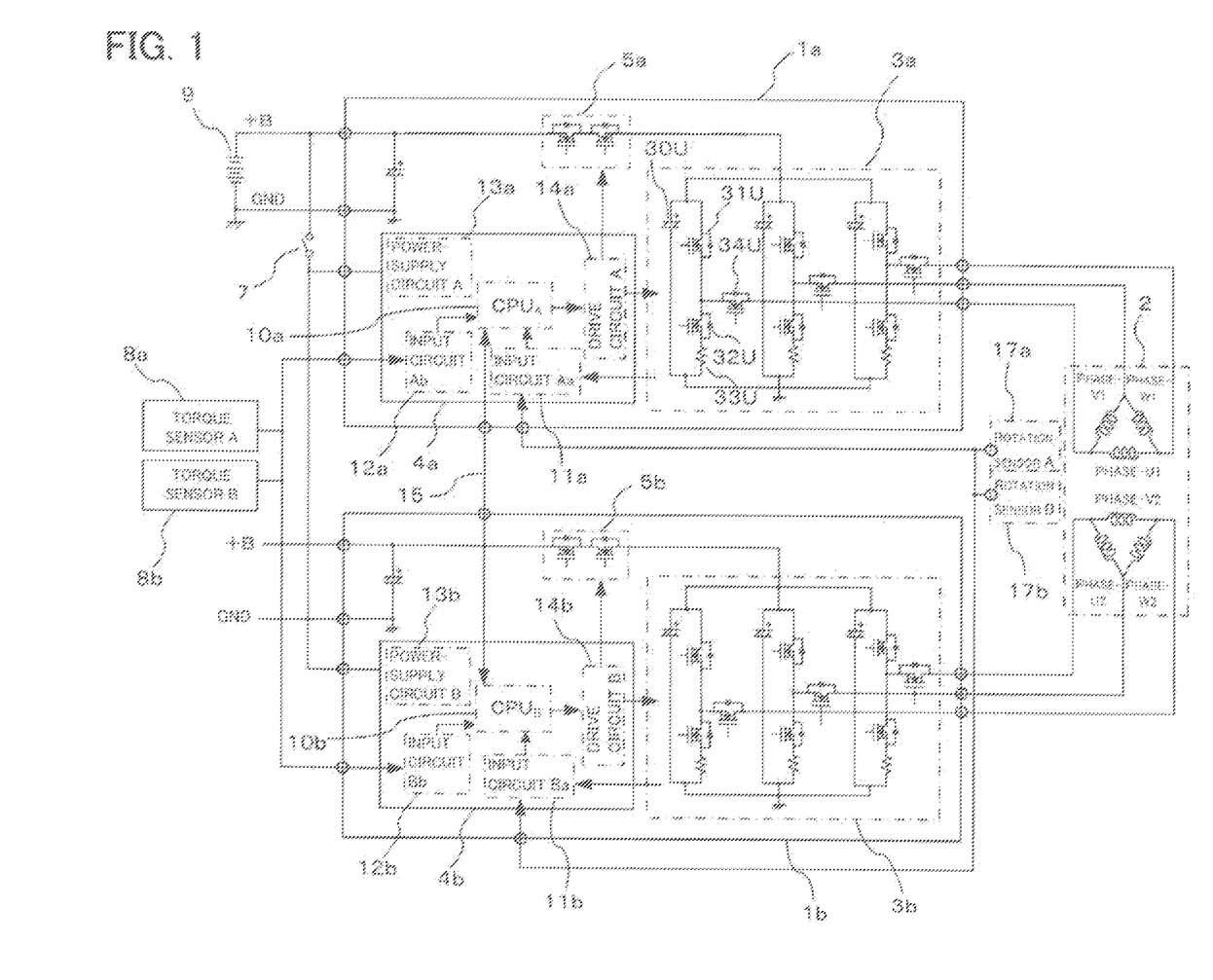
FIG. 1 is an overall circuit diagram illustrating, by way of example, an electric power steering apparatus in Embodiment 1.
Figure 2:
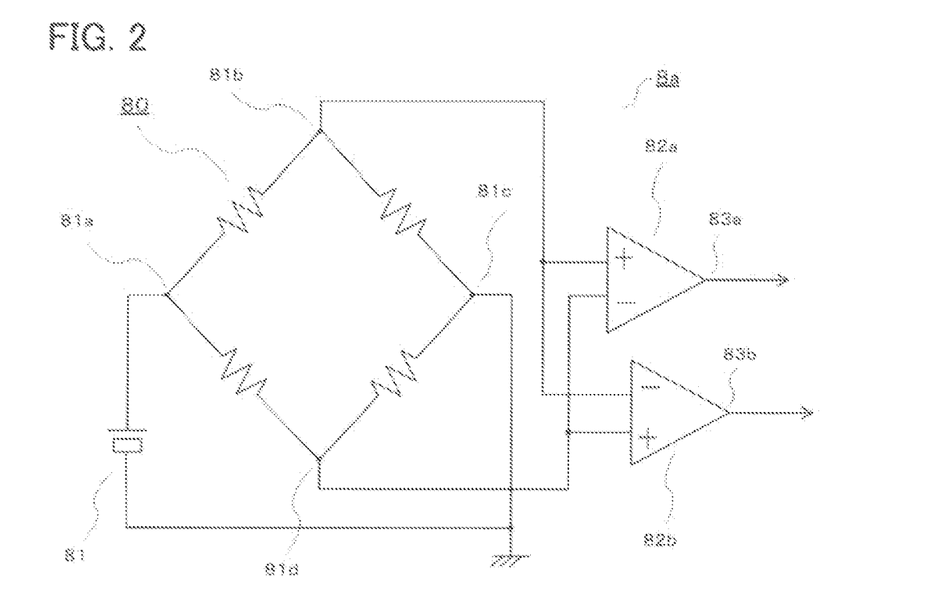
FIG. 2 is a circuit diagram of a torque sensor according to Embodiment 1.
Figure 3:
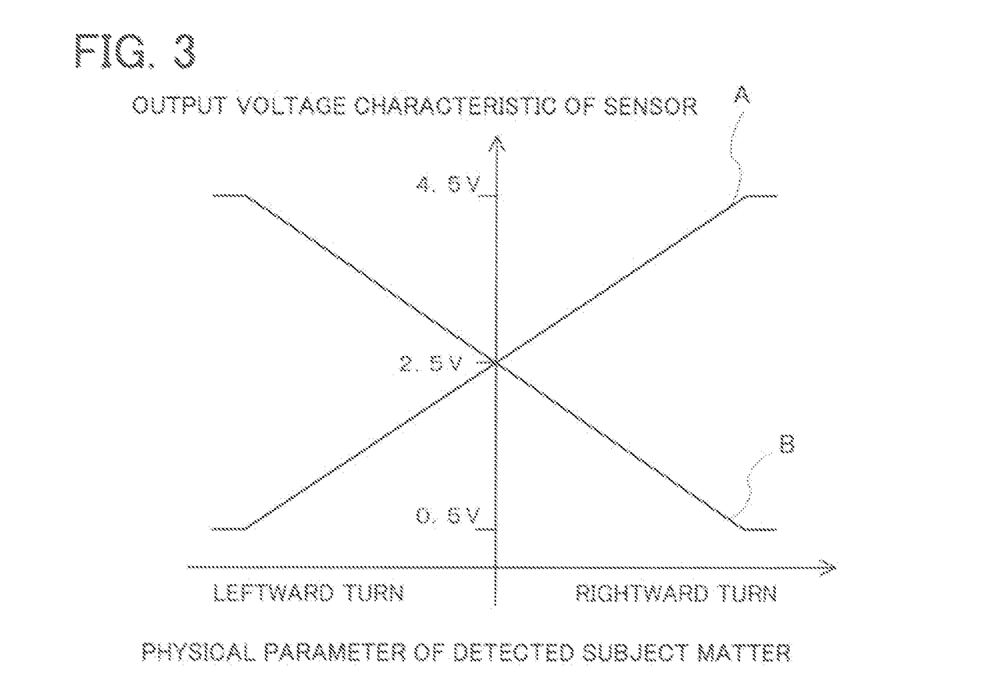
FIG. 3 is a diagram showing, by way of example, characteristics of output signals of the torque sensor according to Embodiment 1.

FIG. 1 is a circuit diagram illustrating an electric power steering apparatus according to Embodiment 1. In addition, FIG. 2 is a circuit diagram of a torque sensor, and FIG. 3 is a diagram showing its output signals.

The electric power steering apparatus of Embodiment 1 illustrated in FIG. 1 includes electronic control devices 1a and 1b, and a motor 2. The electronic control devices 1a and 1b are approximately in the same circuit configurations to each other; and in addition, the motor 2 is a brushless motor including three-phase windings (U1, V1 and W1) in groups of two. A redundant system is achieved in such a manner that, even when abnormality is caused on either one of the electronic control devices or on any one of windings of the motor, a motor control can be maintained and thus the motor can be rotated, while the other control device or windings being normal. For this reason, the explanation will be solely made for one party or device in the following description.

Into the electronic control device 1a, inputted are respective signals of a power supply (battery) 9, an ignition switch 7, a torque sensor A, 8a, a torque sensor B, 8b, a rotation sensor A, 17a, and a rotation sensor B, 17b. The electronic control device 1a is constituted of a control circuit 4a, an inverter circuit 3a, a power relay 5a and the like, and is connected to the other electronic control device 1b through a communications channel or line 15.

The control circuit 4a is constituted of a power-supply circuit A, 13a, an input circuit Aa, 11a, an input circuit Ab, 12a, a $CPU_A$ 10a being a central processing unit, and a drive circuit A, 14a; and so, the $CPU_A$ 10a calculates electric power to supply it for the rotation of the motor in accordance with an input(s) of the torque sensor A, 8a, and the control circuit thus outputs the electric power by way of the drive circuit A, 14a.

In the inverter circuit 3a, switching devices (for example, FETs 31U and 32U) forming bridge circuitry of the upper and lower arms are disposed in order to supply electric currents into the three-phase windings (U1, V1 and W1). Moreover, a relay 34U capable of interrupting an electric current into the motor 2, and a shunt resistor 33U in use for detecting an electric current are also included. A capacitor 30U is included for suppressing the variation or fluctuation of the electric power-supply voltage in the inverter circuit 3a due to turn-ons of the switching device 31U or 32U and turn-offs thereof.

As another function, the power relay 5a enables the interruption of the principal power supply for the purpose of fail-safe. Moreover, in order to detect a rotation angle of the motor 2, the rotation sensor A, 17a, and the rotation sensor B, 17b, being two of the rotation sensors each of which independently operates, are disposed in proximity to the motor 2.

Note that, as also for a control circuit 4b of the electronic control device 1b, the control circuit is similarly constituted of a power-supply circuit B, 13b, an input circuit Ba, 11b, an input circuit Bb, 12b, a CPUs 10b being a central processing unit, and a drive circuit B, 14b, as described above.

Because the electronic control devices 1a and 1b are configured to independently operate with each other as described above, it is so arranged that, even when one control device is abnormal, the other control device is enabled to drive the motor 2, so that the redundancy is secured. No that, the electronic control device 1b also includes the control circuit 4b, the $CPU_B$ 10b and the like described above, which are similar to the constituent elements of the electronic control device 1a. In addition, the symbols "○" on the outer bounding frames of the electronic control devices 1a and 1b each in the figure designate respective connectors for use in interconnections.

Next, the explanation will be made referring to FIG. 2 and FIG. 3 for a redundant system of torque sensors. A torque sensor is a sensor for detecting steering torque of the motor-vehicle's steering-wheel being a detection-targeted object or detected subject matter, and so, the torque sensor A, 8a, is made as one sensor by a circuit shown in the diagram in FIG. 2, for example. An electric power source 81 is supplied to four resistors of a bridge circuit 80 at its opposing corners 81a to 81d, so that, in a case in which torque is not produced, namely, in which steering is not caused, the four resistance values are approximately at the same values, and thus, an electric potential difference is not produced across the opposing corners (81b and 81d) to which the electric power source is not supplied. By steering the steering-wheel, the resistance values vary: although an electric potential difference is not produced between the opposing corner 81a and the opposing corner 81c, an electric potential difference is produced between the opposing corner 81b and the opposing corner 81d, so that a signal is outputted to an output signal port 83a by way of an amplifier A, 82a, by which the electric potential difference having been produced is detected and amplified.

Because an amplifier B, 82b, has reverse input signals of "+" and "−" with respect to those of the amplifier A, 82a, a signal characteristic at an output signal port 83b, as the signal characteristic (refer to the characteristic line B in the figure) at the output signal port 83b, takes on a reverse signal characteristic with respect to a signal characteristic (refer to the characteristic line A in the figure) at the output signal port 83a, as shown in FIG. 3. Note that, because signals of the output signal ports 83a and 83b are inputted into the $CPU_A$ 10a, a range of the signals where they can take on is defined between 0 V and 5 V.

Moreover, because the steering wheel is steered in either direction to the right or to the left, the midpoint position (straight forward running position without undergoing steering by a steering-wheel) is defined to take on 2.5 V; and so, the characteristic is defined in such a manner that a voltage value at the output signal port 83a takes on a value larger than 2.5 V in a rightward turn direction (refer to the characteristic line A), or the voltage value thereat takes on a value smaller than 2.5 V on the contrary in a leftward turn direction (refer to the characteristic line A).

Note that, in FIG. 3, the horizontal axis indicates a physical parameter of a detected subject matter such as a steering-wheel or the like, and the vertical axis indicates output voltage characteristics of a torque sensor as a detection sensor.

Furthermore, because the settings are made to take on the maximum voltage value=4.5 V at the output signal port 83a and the minimum voltage value=0.5 V thereat, it is so arranged that, when a disconnection fault (the voltage value ≅0 V), a short-to-power fault (the voltage value ≅5 V) or a short-to-ground fault (the voltage value ≅0 V) is caused, its abnormality can be immediately determined.

If two groups of torque sensors as those described above are included, four output signal ports are required therefor, so that two groups of circuits and the two groups of sensors are in total required in accordance with the arrangement, which brings about the demerits from a viewpoint of the costs and also from that of mounting capability. For dealing therewith, as for a configuration of the device related to the redundancy, the device has equivalent redundancy performance to that in a conventional device having four output signal ports, whereas the device is configured in that the second group of torque sensor has only one output signal port, so that a circuit(s), an output signal line(s) and other constituent elements are reduced.

The exemplary explanation will be made for normality determination or abnormality determination of the electronic control device 1a including an abnormality determination unit (its explanation will be made later in detail) in a case in which the torque sensor A, 8a, having two output signal ports and the torque sensor B, 8b, having one output signal port are placed in the groups of two. It is presumed that the abnormality determination unit is incorporated in the $CPU_A$ 10a. Here, it is presumed that the torque sensor B, 8b, includes an output signal port 83c (not shown in the figure) which outputs an equivalent signal to that of the output signal port 83a. Because these three output signal ports are included, two outputs at the respective output signal ports are compared two by two, in turn.

First, when voltage values at the output signal ports 83a and 83b are added to each other, the addition takes on about 5 V, constant, when they are normal. Next, when voltage values at the output signal ports 83b and 83c are added to each other, the addition similarly takes on 5 V, constant, when they are normal. Similarly, when voltage values at the output signal ports 83a and 83c are subtracted from each other, the subtraction takes on about 0 V, constant, when they are normal. As described above, voltage values at the three output signal ports are compared two by two, in turn, so that their normality and abnormality each can be determined. In what follows, voltage values at the output signal ports 83a, 83b and 83c in three places described above are designated as [83a], [83b] and [83c], respectively.

The comparison and verification described above are executed in the abnormality determination units each placed in the interior of the $CPU_A$ 10a and $CPU_B$ 10b of FIG. 1 as will be described later. Specific comparison and verification schemes undergo five cases in the total sum of eight kinds as follows.

Figure 4:
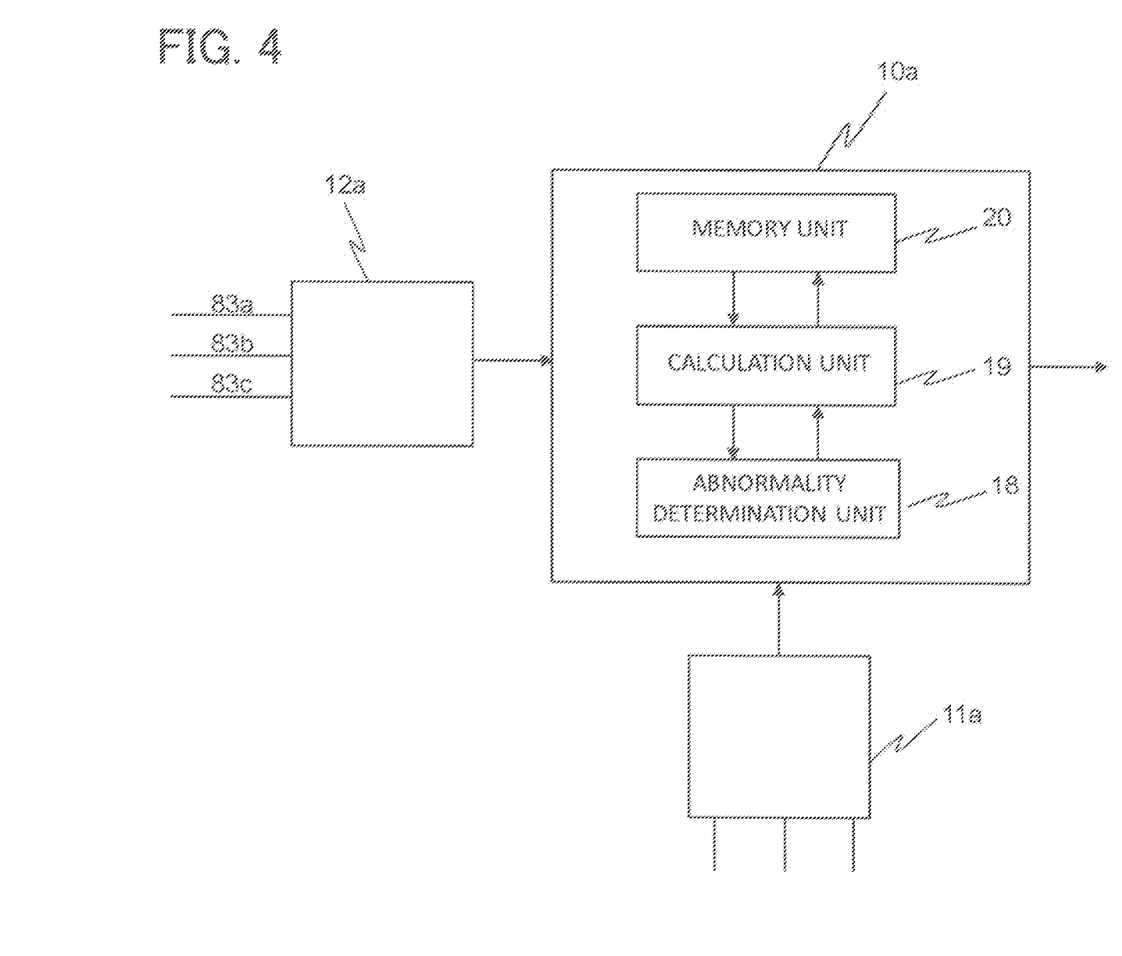
FIG. 4 is a partially enlarged view of a control circuit of the electric power steering apparatus in Embodiment 1.

1) Voltage values at the output signal ports in a case in which an "83a" system is determined being abnormal:
[83a]+[83b]≠5 V, AND [83b]+[83c]=5 V
[83a]−[83c]≠0 V, AND [83b]+[83c]=5 V 2) Output signal's voltage values in a case in which an "83b" system is determined being abnormal:
[83a]+[83b]≠5 V, AND [83a]−[83c]=0 V
[83b]+[83c]≠5 V, AND [83a]−[83c]=0 V 3) Output signal's voltage values in a case in which an "83c" system is determined being abnormal:
[83b]+[83c]≠5 V, AND [83a]+[83b]=5 V
[83a]−[83c]≠0 V, AND [83a]+[83b]=5 V 4) Output signal's voltage values in a case in which all of the systems are determined being normal:
[83a]+[83b]=5 V, AND [83b]+[83c]=5 V, AND [83a]−[83c]=0 V 5) Output signal's voltage values in a case in which two or more of the sensor systems are determined being abnormal:
[83a]+[83b]≠5 V, AND [83a]−[83c]≠0 V, AND [83b]+[83c]≠5 V Here, the $CPU_A$ 10a described above includes an abnormality determination unit 18, a calculation unit 19 and a memory unit 20 which are three principal constituent elements as shown in FIG. 4 in detail. Into the $CPU_A$ 10a, signals from a total sum of three output signal ports, i.e., those from the output signal ports 83a and 83b of the torque sensor A, 8a, and the output signal port 83c of the torque sensor B, 8b, are inputted by way of the input circuit Ab, 12a, as described above. And then, the $CPU_A$ 10a is a CPU in which, based on voltage values at these three kinds of different output signal ports, voltage values at two arbitrarily different output signal ports from the three kinds of output signal ports are selected in groups; the sums of those voltage values, or the sum(s) of those voltage values and the difference therebetween are calculated by the calculation unit 19; and at least two of those results are stored by the memory unit 20, and also, a signal at each of the output signal ports is determined either being normal or abnormal by the aforementioned abnormality determination unit 18.

Next, the exemplary explanation will be made referring to a flowchart diagram illustrated in FIG. 5 for an example of a determination method of determining whether a signal of each of the output signal ports is normal or abnormal in the aforementioned abnormality determination unit 18.

Figure 5:
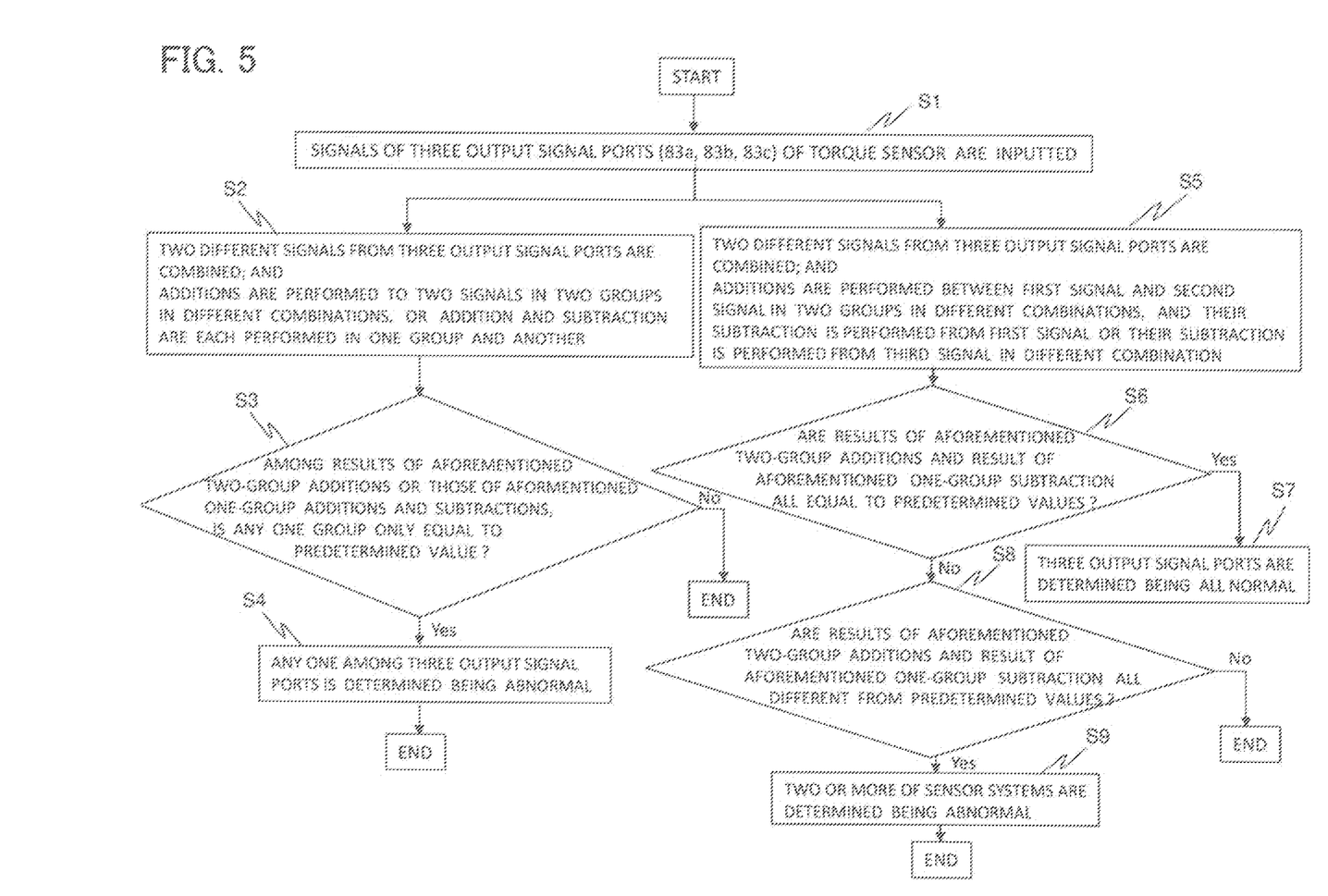
FIG. 5 is a flowchart diagram illustrating, by way of example, a method of determining abnormality of a sensor system in the electric power steering apparatus of Embodiment 1.

To be specific, FIG. 5 is a diagram for explaining a method of determining that, in a case in which signals of the output signal ports 83a, 83b and 83c being inputted into the $CPU_A$ by way of the input circuit Ab, 12a, are in particular inputted (Step S1) among signals of output signal ports being inputted into the $CPU_A$ 10a within the control circuit 4a shown in FIG. 1 by way of the input circuits, those output signal ports are each normal or abnormal.

On the left side in the diagram, a flowchart from Step S2 to Step S4 indicates the flows (from the case 1) to the case 3) described above) in which a system of one output signal port (the same as a sensor system: here, the system means a "schematic or organized system") in particular determines its normality or abnormality; and, on the right side in the diagram, a flowchart from Step S5 to Step S9 indicates the flows (the case 4) and the case 5) described above) in which a system of two or more output signal ports (the same as a sensor system) determines their normality or abnormality. Among those flows, the flows from Step S5 to Step S7 indicate flows in a case in which determination is performed whether all of the sensor systems of the case 4) described above are normal or not; and the flow of Step S5, those from Step S6 to Step S8, and that of Step S9 indicate flows in a case in which determination is performed whether two or more sensor systems of the case 5) described above are abnormal or not.

When the abnormality determination unit 18 determines abnormality in the cases 1) through 3) described above, the motor control is maintained by using a normal output signal(s) for continuing the control. It should be noted that, the verification of abnormality determination results of both of the $CPU_A$ 10a and $CPU_B$ 10b is also made possible when the $CPU_A$ and $CPU_B$ are presumed that they are connected through the communications line 15 to each other: the control is continued by using a normal value(s) when the abnormality determination results of both of the CPUs are identical in their results, whereas it becomes impossible to continue the control when the abnormality determination results of both of the CPUs are different in their results, or in a case of 5) described above; however, it is also possible to operate in such a manner that an abrupt control interruption is avoided by temporarily utilizing a value proximal to a previous value having been a normal value.

According to the abnormality determination in the manner described above, the control can be continued by using only a normal sensor output signal without interrupting the currently executing control. Moreover, even in a configuration having four output signal ports of a conventional device, there results in performing similar comparison and verification, so that no significant differences exist between a configuration of three output signal ports and that of the four output signal ports; however, the amplifier B, 82b, of FIG. 2 and the output signal port 83b thereof can be reduced by one each.

As described above, under a condition on which output signals of a sensor in a first group do not have the same characteristic between an output characteristic of one output signal and that of the other output signal, but both of the output signals have a constant predetermined relationship therebetween, and also another condition on which a characteristic of a sensor in a second group is the same as either characteristic in the first group, the same degree of redundancy can be included in a configuration not having two groups of completely independent sensors, but in the configuration having three output signal ports in total in which the second group is made in a sensor configuration having only one output signal port; and thus, a circuit(s), an output signal line(s) and others can be reduced.

Note that, in the sensor of FIG. 2, the amplifiers being output circuits are in two (amplifier A and amplifier B), and the bridge circuit 80 being the sensor itself is in one; however, it may be adopted to configure in such a manner that sensors themselves are also used in two, and that the respective output circuits are provided for them.

Embodiment 2

Next, because it is possible for an object to obtain effects similar to those in Embodiment 1 even with sensors other than those torque sensors, the explanation will be made referring to FIG. 6 and FIG. 7 for other sensors. In Embodiment 2, the exemplary explanation will be made for the rotation sensor A, 17a, and the rotation sensor B, 17b, in the electric power steering apparatus of FIG. 1.

Figure 6:
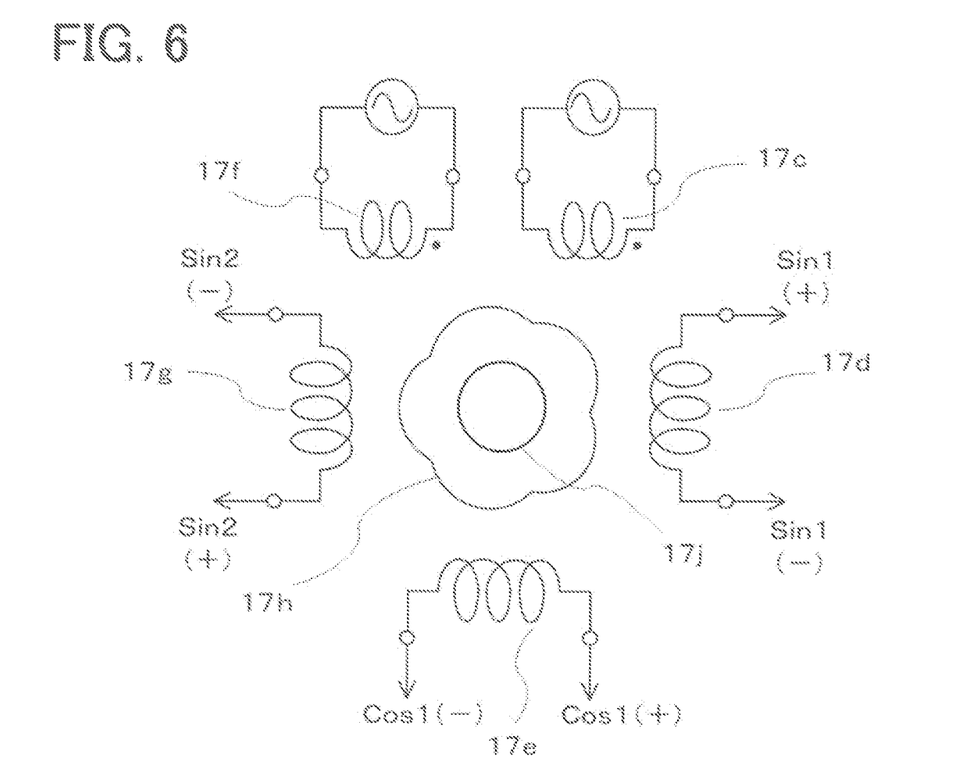
FIG. 6 is a circuit diagram of a rotation sensor according to Embodiment 2.

FIG. 6 illustrates a schematic circuit diagram of a rotation sensor, which is a sensor made of resolvers, for example. In the middle of the sensor, a moving rotor 17h is mounted on an output shaft's end 17j of the motor 2 functioning as a detected subject matter where the moving rotor is placed in a circular petal shape, so that the moving rotor 17h rotates in accordance with the rotation of the output shaft of the motor 2. Among the five coils, the coils 17c and 17f are excitation coils, so that electric currents flow through detection coils 17d, 17e and 17g in accordance with the differences between convex sections each of the circular petal-shaped moving rotor 17h and concave sections each thereof. A first group of resolvers is constituted of the excitation coil 17c, and the detection coils 17d and 17e. A second group of resolvers is constituted of the excitation coil 17f and the detection coil 17g.

Figure 7:
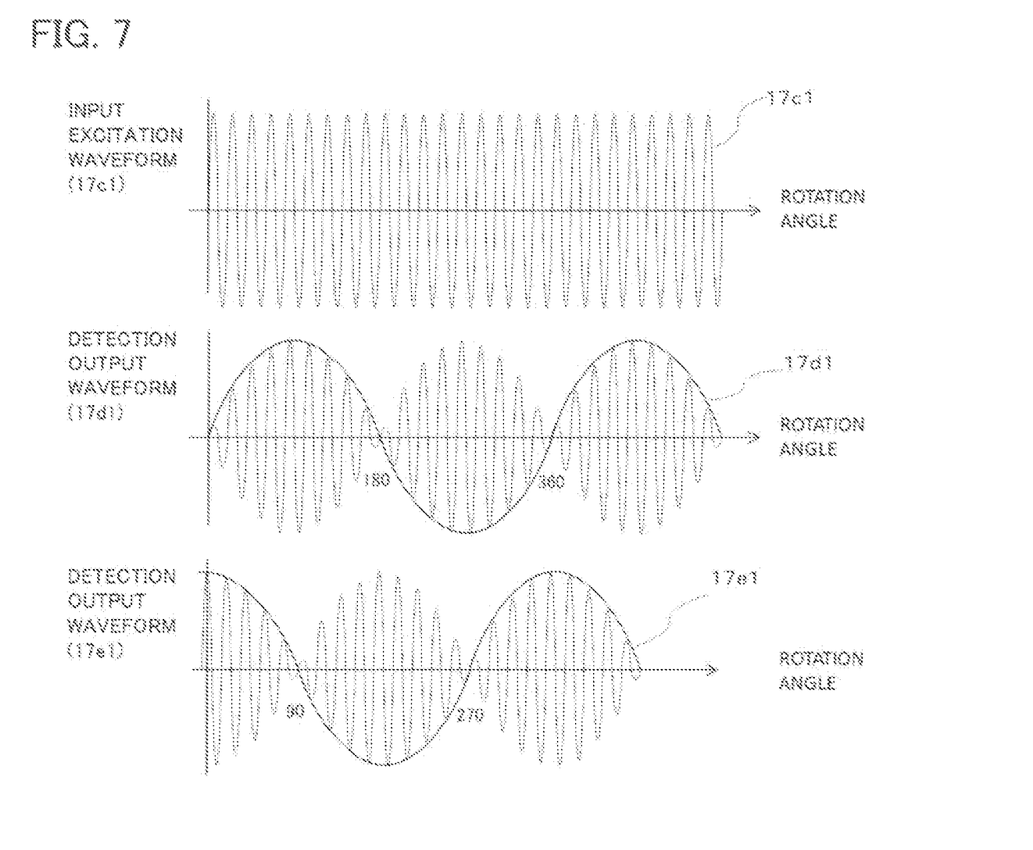
FIG. 7 is a diagram showing characteristics of output signals of the rotation sensor according to Embodiment 2.

Signal waveforms are shown in FIG. 7. Across the excitation coil 17c, an excitation waveform is applied, which takes on a waveform of "17c1." Depending on a case in which the convex-and-concave sections (circular petal shapes) of the moving rotor 17h approach to the detection coils 17d and 17e or a case in which the convex-and-concave sections move away from the detection coils, signals generated across the detection coils 17d and 17e take on a detection output waveform 17d1 whose shape is a waveform of sine curve, or a detection output waveform 17e1 whose shape is a waveform of cosine curve, respectively. Based on these detection output waveform 17d1 being the waveform of sine curve and detection output waveform 17e1 being the waveform of cosine curve, the tangent therebetween is acquired, so that a rotation angle being an objective or physical characteristic is calculated.

Meanwhile, as for the second group of sensor in which an excitation signal is defined and one output of a sine curve (or cosine curve) is defined, the three output signals are compared two by two, in turn, so that determination of either normality or abnormality is carried out. When the comparison (subtraction) is performed between the detection output waveform 17d1 and the detection output waveform 17e1 by shifting the phase of either one of the detection output waveforms by a predetermined angle (90 degrees), they result in taking on about 0 V when they are normal. Similarly, comparison and verification can be performed between the detection output waveform 17e1 and a detection output waveform 17g1 (not shown in the figure) being a waveform of sine curve by also shifting the phase of either one of them by a predetermined angle, so that the comparison between the detection output waveforms 17d1 and 17g1, and the verification thereof can be performed between themselves by means of their simple comparison (subtraction).

Here, the detection output waveforms 17d1, 17e1 and 17g1 in the rotation sensors correspond to the outputs at the output signal ports 83a, 83b and 83c in the case of those torque sensors in Embodiment 1, respectively. Therefore, determination of normality of the system of rotation sensors or abnormality thereof can be performed similarly to the case of Embodiment 1.

As described above, in such a case in which there exists a constant relationship between two output signals in the first group even with the rotation sensors, and a case in which an output signal in the second group of sensor is the same output signal as either one in the first group, determination of either normality or abnormality can be carried out by performing the comparison and verification between the respective three output signals. According to this arrangement, it is possible to achieve the reduction of the costs and the enhancement of mounting capability, rather than a sensor configuration having completely two-fold amounts, namely, two groups of two respective output signals, i.e., rather than the sensor configuration having a total sum of four output signals.

Note that, the kinds of applicable sensors are not necessarily limited to devices or elements described above: for example, a Hall element, a magneto-resistance element and the like may also be applicable, so that a feature also resides in that general versatility is associated with.

In addition, in FIG. 1, the explanation has been made for the configuration of the two CPUs ($CPU_A$ and $CPU_B$); however, even in a configuration of one CPU, and further in such a configuration of one of the electronic control device 1a or 1b, it is possible to configure a device by which similar effects described above can be achieved when three input signal ports are provided for the torque sensor A, 8a, and the torque sensor B, 8b, or for the rotation sensor A, 17a, and the rotation sensor B, 17b. In addition, in order to obtain similar effects described above, it may also be suitable for a device configuration in which a dual-redundant system is configured by only output stages made of the inverter circuits 3a and 3b, and of the three-phase windings of the motor 2 in groups of two.

As described above, by providing input signal ports for the sensors or output signal ports thereof at three places, it becomes possible to reduce an interface circuit(s), and a port(s) of the CPU.

Moreover, a condition is defined under which output signals of a sensor in a first group do not have the same characteristic between an output characteristic of one output signal and that of the other output signal, but both of the output signals have a constant relationship therebetween, and another condition is defined under which a characteristic of a sensor in a second group is the same as either one of characteristics of the sensor in the first group; however, also in a case in which a characteristic of the sensor in the second group and either one of characteristics of the sensor in the first group have a constant relationship therebetween, failure or malfunction determination can be similarly performed, and the same degree of redundancy can be included. Here, a case of being "the same" and a case of having a "constant relationship" are collectively referred to as a case of having an "equivalent characteristic."

Figure 8:
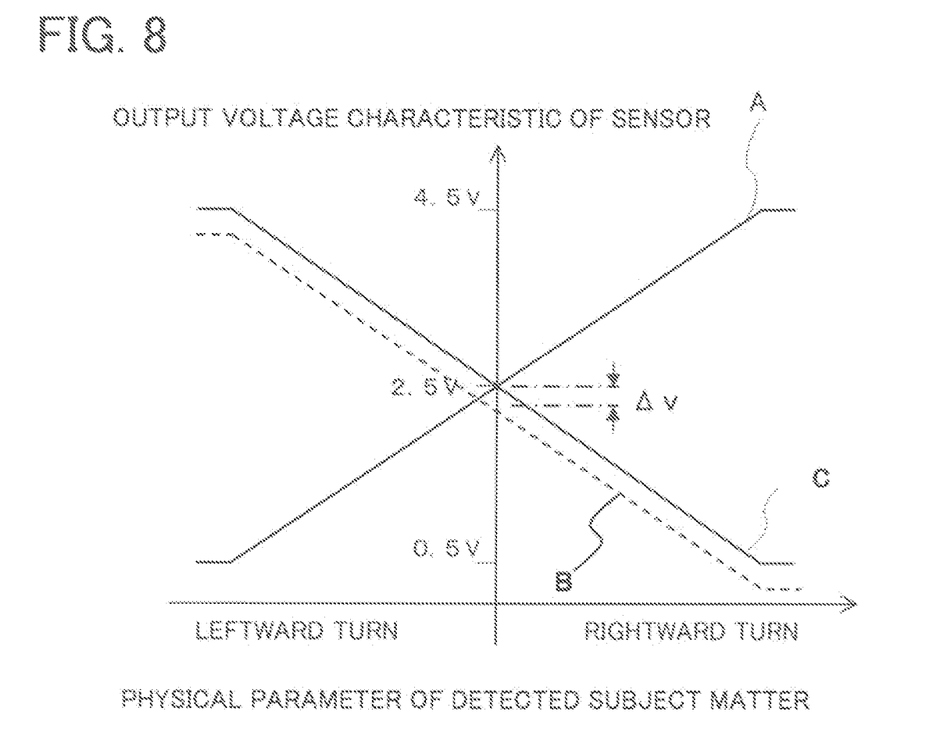
FIG. 8 is a diagram showing, by way of another example, characteristics of output signals of the torque sensor according to Embodiment 1.

Here, in the constant relationship described above, a case is also included in which, for example, a phase is in coincidence with a phase when it is shifted by a predetermined angle in a case of the phases differing from each other by the predetermined angle. Namely, in such a case of combination between the "sin" and "cos" curves, their comparison and verification can be performed by means of a simple calculation (subtraction) when their arrangement is made in such a manner that their phases are shifted to be coincidence with each other. Similarly, a case in which a signal has an offset is also included in the constant relationship. For example, as shown in FIG. 8, in a case in which an offset (the quantity of offset Δv) of a characteristic line B shown by the broken line is compensated in advance before performing the comparison, and a case in which a characteristic line C is defined as a characteristic line whose quantity of offset Δv is cancelled out to be zero, the comparison and verification can be performed when the relationship between a characteristic line A and the characteristic line C is mutually in a reverse characteristic. Namely, even in the relationship between the characteristic line A and the characteristic line B having such a relationship, the relationship therebetween is included in the "constant relationship." Note that, the exemplary explanation has been made for a case in which the characteristic line B only has an offset in the description above; however, it is not necessarily limited to this. Even in a case in which both of a characteristic line A and the characteristic line B have offsets, such a case is also included in which, by cancelling out both of the quantities of offsets to be zero, a relationship between the both becomes mutually in a reverse characteristic.

Furthermore, the control is continued by a remaining normal output signal(s) even after malfunction determination; meanwhile, even in such a case, the comparison and verification is continued by using the remaining normal output signal(s) in order to perform the malfunction determination, so that the determination of either normality or abnormality is performed. According to this arrangement, in a case in which the control is continued following after a primary failure or malfunction, a secondary failure or malfunction is determined even when the secondary failure or malfunction is caused, so that it becomes possible to send out notification to the surroundings in order to transfer to a normal state.

In the disclosure of the application concerned, various exemplary embodiments and implementation examples are described; however, various features, aspects and functions described in one or a plurality of embodiments are not necessarily limited to the applications of a specific embodiment(s), but are applicable in an embodiment(s) solely or in various combinations.

Therefore, limitless modification examples not being exemplified can be presumed without departing from the scope of the technologies disclosed in Description of the disclosure of the application concerned. For example, there arise cases which are included as a case in which at least one constituent element is modified, added or eliminated, and further a case in which at least one constituent element is extracted and then combined with a constituent element(s) of another embodiment.

EXPLANATION OF NUMERALS AND SYMBOLS

Symbols "1a," "1b," each designate an electronic control device; "2," motor; "3a," "3b," inverter circuit; "4a," "4b," control circuit; "8a," torque sensor A; "8b," torque sensor B; "10a," $CPU_A$; "10b," $CPU_B$; "11a," input circuit Aa: "11b," input circuit Ba; "12a," input circuit Ab: "12b," input circuit Bb; "13a," power-supply circuit A; "13b," power-supply circuit B; "14a," drive circuit A; "14b," drive circuit B; "15," communications line; "17a," rotation sensor A; "17b," rotation sensor B; "17d1," "17e1," "17g1," detection output waveform; "18," abnormality determination unit; "80," bridge circuit; "81," electric power source; "81a," "81b," "81c," "81d," opposing corner; "82a," amplifier A; "82b," amplifier B; and "83a," "83b," "83c," output signal port.

What is claimed is:

1. A redundant sensor device, comprising:
    a first torque sensor for detecting a steering torque in physical characteristics of a steering wheel and for outputting a first output signal and a second output signal corresponding to a said steering torque, and also having a constant characteristic in voltage relationship therebetween;
    a second torque sensor for detecting the steering torque in the physical characteristics of the steering wheel and for outputting a third output signal having one of following three characteristics: a characteristic that is equivalent in voltage relationship and is identical to either the first output signal or the second output signal output by the first torque sensor, a characteristic that is different in voltage by a predetermined value, and a characteristic having offset in the third output signal; and a plurality of electronic control devices, each having an abnormality determiner for determining a presence or absence of abnormality of input signals, each using a control circuit for outputting a control signal obtained by calculating electric power supplied into a motor in accordance with the input signals, for controlling said motor, wherein said abnormality determiner is configured to determine a presence or absence of abnormality by a voltage value of three different output signal ports based on the first output signal and the second output signal output from the first torque sensor, and the third output signal output from the second torque sensor, and an output signal of the first torque sensor or an output signal of the second torque sensor determined being normal is used as the control signal.

2. The redundant sensor device as set forth in claim 1, wherein
the equivalent characteristic includes a same characteristic, or a characteristic mutually having a constant relationship.

3. The redundant sensor device as set forth in claim 2, wherein
both the first torque sensor and the second torque sensor are torque sensors for detecting steering torque of the steering wheel as an output voltage across opposing corners of a bridge circuit.

4. The redundant sensor device as set forth in claim 3, wherein
the constant relationship includes a relationship in which output voltages across opposing corners of the bridge circuit are mutually in a reverse characteristic in said first and second torque sensors.

5. The redundant sensor device as set forth in claim 1, wherein
said abnormality determiner determines a presence or absence of abnormality of the first torque sensor and the second torque sensor by performing comparison and verification on all of output signal pairs selected from the first through the third output signals, and stops using the first output signal of the first torque sensor or the second output signal of the first torque sensor that is determined to be abnormal, or the third output signal of the second torque sensor that is determined to be abnormal, and
controls said motor by using the output signal of said first torque sensor or said second torque sensor, which is determined to be normal.

6. The redundant sensor device as set forth in claim 5, wherein
the constant relationship includes a relationship, when each of output signals of said output signal pairs has an offset before performing comparison and verification on an output characteristic of each of the output signals, after a quantity of the offset is cancelled out to be zero.

7. The redundant sensor device as set forth in claim 5, wherein
said abnormality determiner determines a presence or absence of abnormality of the first torque sensor and that of the second torque sensor, and, when abnormality is determined, usage of an output signal of a sensor determined being abnormal is halted and notification of causing the abnormality is sent out, so that a currently executing control is continued by using only an output signal of a sensor determined being normal; and also
said abnormality determiner subsequently performs comparison and verification for all of output signal pairs selected from output signals excluding an output signal of a sensor determined being abnormal, and continuously performs determination of normality of a sensor and abnormality thereof.

8. A method of determining abnormality of a redundant sensor device, comprising:
using the redundant sensor device as set forth in claim 1;
selecting three output signals being different to one another from output signals of the first torque sensor and from an output signal of the second torque sensor;
performing an addition of two output signals to each other among the three output signals;
performing a subtraction of two output signals from each other among the three output signals;
comparing at least two results from a result of performing the addition and from that of performing the subtraction with values defined in advance; and
determining whether the first torque sensor and the second torque sensor are each normal or not, on a basis of the comparison being performed.

9. A redundant sensor device, comprising:
a first rotation sensor for detecting a rotation angle in physical characteristics of an output shaft of a motor and for outputting a first output signal and a second output signal corresponding to said rotation angle detected, wherein
said first output signal and said second output signal have the same characteristics in phase relationship,
a second rotation sensor for detecting a rotation angle in the physical characteristics of the output shaft of the motor, and for having one of the following three characteristics: a characteristic that is the same as either the first output signal or the second output signal output by the first rotation sensor having the equivalent characteristic in phase relationship corresponding to an detected rotation angle, a characteristic that differs in phase by a predetermined phase, and a characteristic that the third output signal is offset in the third output signal,
a plurality of electronic control devices, each having an abnormality determiner for determining a presence or absence of abnormality of input signals, each using a control circuit for outputting a control signal obtained by calculating electric power supplied into the motor in accordance with the input signals, for controlling said motor, wherein
said abnormality determiner is configured to determine a presence or absence of abnormality by the voltage value of three different output signal ports based on the first output signal and a second output signal output from the first torque sensor, and the third output signal output from a second torque sensor, and an output signal of the first torque sensor or an output signal of the second torque sensor determined being normal is used as the control signal.

10. The redundant sensor device as set forth in claim 9, wherein
the equivalent characteristic includes a same characteristic, or a characteristic mutually having a constant relationship.

11. The redundant sensor device as set forth in claim 10, wherein both the first rotation sensor and the second rotation sensor are any of the rotation sensors that detect the rotation angle of the output shaft of the motor as an AC voltage generated in a coil.

12. The redundant sensor device as set forth in claim 11, wherein in the first and second rotation sensors, phase angles of voltage waveforms generated in the coils are different from each other by a predetermined angle.

13. The redundant sensor device as set forth in claim 10, wherein said abnormality determiner determines a presence or absence of abnormality of the first rotation sensor and the second rotation sensor by performing comparison and verification on all of output signal pairs selected from the first through the third output signals, and stops using the first output signal of the first rotation sensor or the second output signal of the first rotation sensor that is determined to be abnormal, or the third output signal of the second rotation sensor that is determined to be abnormal, and controls said motor by using the output signal of said first rotation sensor or said second rotation sensor, which is determined to be normal.

14. The redundant sensor device as set forth in claim 13, wherein the constant relationship includes a relationship, when each of output signals of said output signal pairs has an offset before performing comparison and verification on an output characteristic of each of the output signals, after a quantity of the offset is cancelled out to be zero.

15. The redundant sensor device as set forth in claim 13, wherein
said abnormality determiner determines a presence or absence of abnormality of the first rotation sensor and that of the second rotation sensor, and, when abnormality is determined, usage of an output signal of a sensor determined being abnormal is halted and notification of causing the abnormality is sent out, so that a currently executing control is continued by using only an output signal of a sensor determined being normal; and also
said abnormality determiner subsequently performs comparison and verification for all of output signal pairs selected from output signals excluding an output signal of a sensor determined being abnormal, and continuously performs determination of normality of a sensor and abnormality thereof.

16. A method of determining abnormality of a redundant sensor device, comprising:
using the redundant sensor device as set forth in claim 9;
selecting three output signals being different to one another from output signals of the first rotation sensor and from an output signal of the second rotation sensor;
performing an addition of two output signals to each other among the three output signals;
performing a subtraction of two output signals from each other among the three output signals;
comparing at least two results from a result of performing the addition and from that of performing the subtraction with values defined in advance; and
determining whether the first rotation sensor and the second rotation sensor are each normal or not, on a basis of the comparison being performed.

* * * * *